(12) United States Patent
Nishimura et al.

(10) Patent No.: US 12,211,631 B2
(45) Date of Patent: Jan. 28, 2025

(54) ATTACHMENT STRUCTURE OF WIRING MEMBER

(71) Applicant: Sumitomo Wiring Systems, Ltd., Mie (JP)

(72) Inventors: Tetsuya Nishimura, Mie (JP); Takuya Kaba, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 18/492,996

(22) Filed: Oct. 24, 2023

(65) Prior Publication Data

US 2024/0055156 A1 Feb. 15, 2024

Related U.S. Application Data

(63) Continuation of application No. 17/413,725, filed as application No. PCT/JP2018/046279 on Dec. 17, 2018, now Pat. No. 11,837,387.

(51) Int. Cl.
*H01B 7/40* (2006.01)
*B60R 16/02* (2006.01)
(Continued)

(52) U.S. Cl.
CPC .......... *H01B 7/40* (2013.01); *B60R 16/0215* (2013.01); *H01B 7/0045* (2013.01); *H02G 3/32* (2013.01)

(58) Field of Classification Search
CPC .......... H01B 7/40; H01B 7/0045; H02G 3/30; H02G 3/32; B60R 16/0215
(Continued)

(56) References Cited

U.S. PATENT DOCUMENTS 4,185,800 A * 1/1980 Kabel ................. F16B 19/1081
24/453
6,388,883 B1 * 5/2002 Serizawa ............ B60R 16/0215
361/752
(Continued)

FOREIGN PATENT DOCUMENTS

CN 1388049 1/2003
CN 101531170 9/2009
(Continued)

OTHER PUBLICATIONS

Office Action issued in China Patent Application No. 202210793298.0, dated Mar. 22, 2024, together with English translation thereof.
(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A wiring member includes a base member, a wire-like transmission member fixed to the base member, and a plurality of attaching members provided to the base member to be attached to an attaching target member. One attaching member is provided to only one lateral side of the wire-like transmission member in a first position along an extension direction of the wire-like transmission member in the base member. Another attaching member is provided to only another lateral side of the wire-like transmission member in a second position along the extension direction of the wire-like transmission member.

6 Claims, 15 Drawing Sheets

(51) Int. Cl.
  *H01B 7/00* (2006.01)
  *H02G 3/32* (2006.01)
(58) Field of Classification Search
  USPC .......................................... 174/117 R, 72 A
  See application file for complete search history.

(56) References Cited

U.S. PATENT DOCUMENTS

| | | | |
|---|---|---|---|
| 6,526,628 | B1 | 3/2003 | Caveney et al. |
| 7,407,408 | B1* | 8/2008 | Taylor .................... H05K 1/118 |
| | | | 439/492 |
| 2005/0016760 | A1* | 1/2005 | Vasichek ............. B60R 16/0215 |
| | | | 174/135 |
| 2013/0137314 | A1 | 5/2013 | Shimoji |
| 2014/0151116 | A1* | 6/2014 | Doshita ................. F16B 5/0664 |
| | | | 174/70 R |
| 2015/0047895 | A1 | 2/2015 | Doushita et al. |
| 2015/0329069 | A1* | 11/2015 | Daugherty .......... B60R 16/0207 |
| | | | 174/72 A |
| 2016/0156165 | A1* | 6/2016 | Katou ................. B60R 16/0215 |
| | | | 174/99 R |

FOREIGN PATENT DOCUMENTS

| | | |
|---|---|---|
| CN | 102192226 | 9/2011 |
| CN | 103138078 | 6/2013 |
| CN | 203895858 U | 10/2014 |
| CN | 104428172 | 3/2015 |
| JP | 4-58036 U | 5/1992 |
| JP | 11-165675 | 6/1999 |
| JP | 2000-67659 | 3/2000 |
| JP | 2000-310208 | 11/2000 |
| JP | 2004-357456 | 12/2004 |
| JP | 2015-096760 | 5/2015 |
| JP | 2017-046443 | 3/2017 |

OTHER PUBLICATIONS

International Search Report issued in International Patent Application No. PCT/JP2018/046279, dated Jan. 29, 2019, along with an English translation thereof.

Japan Office Action issued in Japan Patent Application No. 2019-96180, dated Nov. 1, 2022, along with an English translation thereof.

* cited by examiner

F I G. 1 8
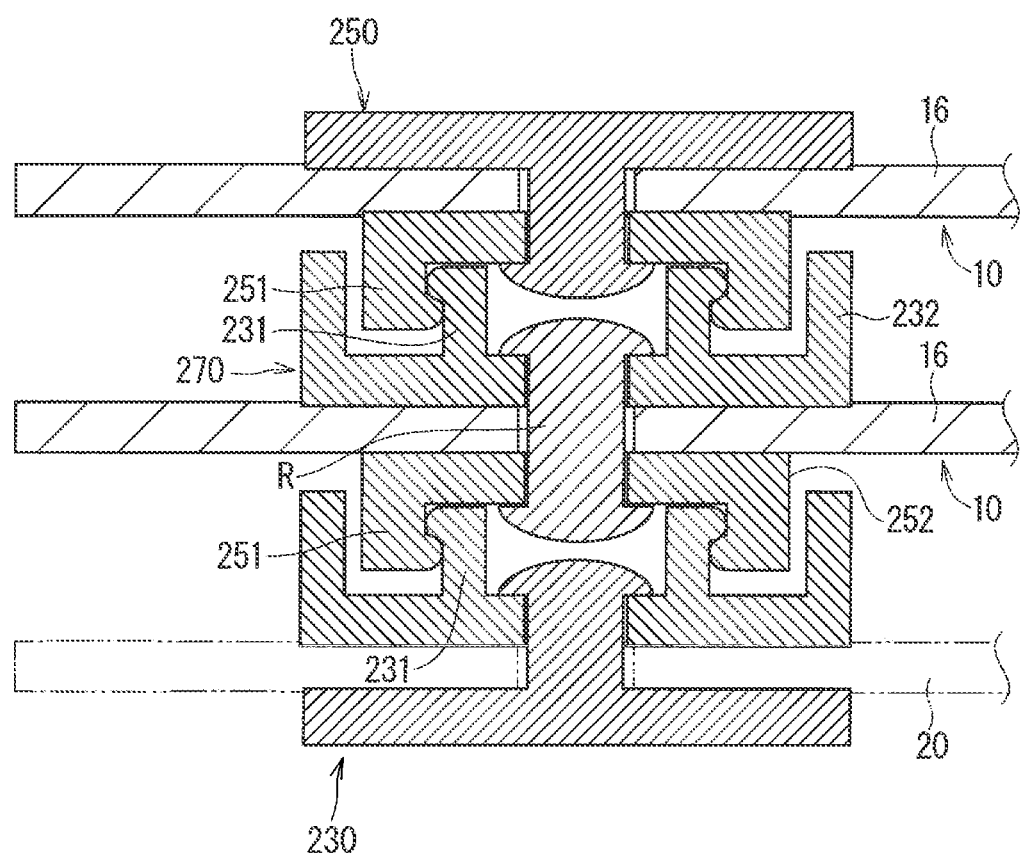

ATTACHMENT STRUCTURE OF WIRING MEMBER

CROSS-REFERENCE TO RELATED APPLICATIONS

This is a continuation of U.S. patent application Ser. No. 17/413,725, filed Jun. 14, 2021, which is a National Phase application of International Pat. Appl. No. PCT/JP2018/046279, filed Dec. 17, 2018. The disclosure of each of the above-mentioned documents, including the specification, drawings, and claims, is incorporated herein by reference in its entirety.

TECHNICAL FIELD

The present invention relates to a technique of attaching a wiring member to an attaching target member such as a vehicle.

BACKGROUND ART

Patent Document 1 discloses a clamp including an electrical wire attachment part attachable to an electrical wire, a first locking part formed to be able to be inserted into and locked to an attaching hole formed in an attaching target object, and a second locking part formed to be able to be inserted into and locked to a fixing hole formed in a protection material.

PRIOR ART DOCUMENTS

Patent Documents

Patent Document 1: Japanese Patent Application Laid-Open No. 2017-46443

SUMMARY

Problem to be Solved by the Invention

However, it is considered that in a shape of the first locking part of the clamp described in Patent Document 1, the first locking part is elastically deformed in a spreading direction when force is applied to the clamp locked to the attaching hole in a direction of pulling the clamp from the attaching hole, thus the clamp is hardly pulled out. Thus, it is hard to detach the wiring member from the attaching target member at a time of repair after the attachment.

An object of the present invention is to provide a technique of easily detaching a wiring member from an attaching target member.

Means to Solve the Problem

In order to solve the above problem, an attachment structure of a wiring member according to a first aspect includes: a convex-shaped part; a concave-shaped part into which the convex-shaped part can be inserted; a wiring member including a wire-like transmission member and provided with one of the convex-shaped part and the concave-shaped part; and an attaching target member which is an attaching target of the wiring member and provided with another one of the convex-shaped part and the concave-shaped part, wherein an elastic deformation part is formed in at least one of the convex-shaped part and the concave-shaped part, and when the convex-shaped part is inserted into the concave-shaped part upon receiving force toward a first direction, the elastic deformation part is elastically deformed by the force toward the first direction to fit the convex-shaped part to the concave-shaped part, and when the convex-shaped part is pulled from the concave-shaped part upon receiving force toward a second direction opposite to the first direction, the elastic deformation part is elastically deformed by the force toward the second direction in a direction similar to the case of receiving the force toward the first direction, and releases a fitting state of the convex-shaped part and the concave-shaped part.

An attachment structure of a wiring member according to a second aspect is the attachment structure of the wiring member according to the first aspect, wherein a male snap fastener is provided as a member including the convex-shaped part.

An attachment structure of a wiring member according to a third aspect is the attachment structure of the wiring member according to the second aspect, wherein a female snap fastener corresponding to the male snap fastener is provided as a member including the concave-shaped part.

An attachment structure of a wiring member according to a fourth aspect is the attachment structure of the wiring member according to any one of the first to third aspects, wherein the convex-shaped part includes a first insertion part formed to be gradually widened from a tip end side to a back end side in an insertion direction of being inserted into the concave-shaped part and a second insertion part located closer to the back end side in the insertion direction of being inserted into the concave-shaped part in relation to the first insertion part and formed to be gradually narrowed from the tip end side to the back end side in the insertion direction of being inserted into the concave-shaped part, and the elastic deformation part is formed in the concave-shaped part to be able to widen an opening of the concave-shaped part at a time of inserting the first insertion part in attaching the convex-shaped part and the concave-shaped part and narrowing the opening of the concave-shaped part at a time of inserting the second insertion part.

An attachment structure of a wiring member according to a fifth aspect is the attachment structure of the wiring member according to any one of the first to fourth aspects, wherein the elastic deformation part is formed in the convex-shaped part to be able to narrow the convex-shaped part at a time of inserting the convex-shaped part into the concave-shaped part and widening the convex-shaped part after inserting the convex-shaped part into the concave-shaped part.

An attachment structure of a wiring member according to a sixth aspect is the attachment structure of the wiring member according to any one of the first to fifth aspects, wherein the wiring member is a flat wiring member including a plurality of wire-like transmission members and a base member keeping the plurality of wire-like transmission members in a flat state.

An attachment structure of a wiring member according to a seventh aspect is the attachment structure of the wiring member according to the sixth aspect, wherein the attaching target member is a vehicle body having a curved surface, and an intermediate part of the flat wiring member along a width direction is curved and disposed along the curved surface of the vehicle body, and both end portions of the flat wiring member along the width direction is attached to the vehicle body by the convex-shaped part and the concave-shaped part.

An attachment structure of a wiring member according to an eighth aspect is the attachment structure of the wiring member according to any one of the first to sixth aspects, wherein the attaching target member is a vehicle body.

An attachment structure of a wiring member according to a ninth aspect is the attachment structure of the wiring member according to any one of the first to sixth aspects, wherein the attaching target member is another wiring member different from the wiring member.

An attachment structure of a wiring member according to a tenth aspect is the attachment structure of the wiring member according to any one of the first to ninth aspects, wherein a male-female snap fastener including both the convex-shaped part and the concave-shaped part is provided, and a second attaching target member different from the attaching target member is attached to the wiring member by the male-female snap fastener.

Effects of the Invention

According to each aspect, when the convex-shaped part is inserted into the concave-shaped part and when the convex-shaped part is pulled from the concave-shaped part, the same elastic deformation part is elastically deformed in the similar manner. Accordingly, the wiring member can be easily detached from the attaching target member.

According to the second aspect, the wiring member can be attached to the attaching target member using the male snap fastener.

According to the third aspect, the wiring member can be attached to the attaching target member using the male snap fastener and the female snap fastener corresponding to the male snap fastener.

According to the fourth aspect, the convex-shaped part and the concave-shaped part can be fitted to each other by the elastic deformation part formed in the concave-shaped part.

According to the fifth aspect, the convex-shaped part and the concave-shaped part can be fitted to each other by the elastic deformation part provided in the convex-shaped part.

According to the sixth aspect, the flat wiring member can be detachably attached to the attaching target member.

According to the seventh aspect, the flat wiring member can be curved and disposed along the curved surface of the vehicle body.

According to the eighth aspect, the wiring member can be attached to the vehicle body by the convex-shaped part and the concave-shaped part.

According to the ninth aspect, the wiring members can be attached to each other by the convex-shaped part and the concave-shaped part.

According to the tenth aspect, the three or more members can be attached.

BRIEF DESCRIPTION OF DRAWINGS

FIG. 18 A cross-sectional view illustrating a modification example of a snap fastener.

DESCRIPTION OF EMBODIMENT(S)

Embodiment

Figure 1:
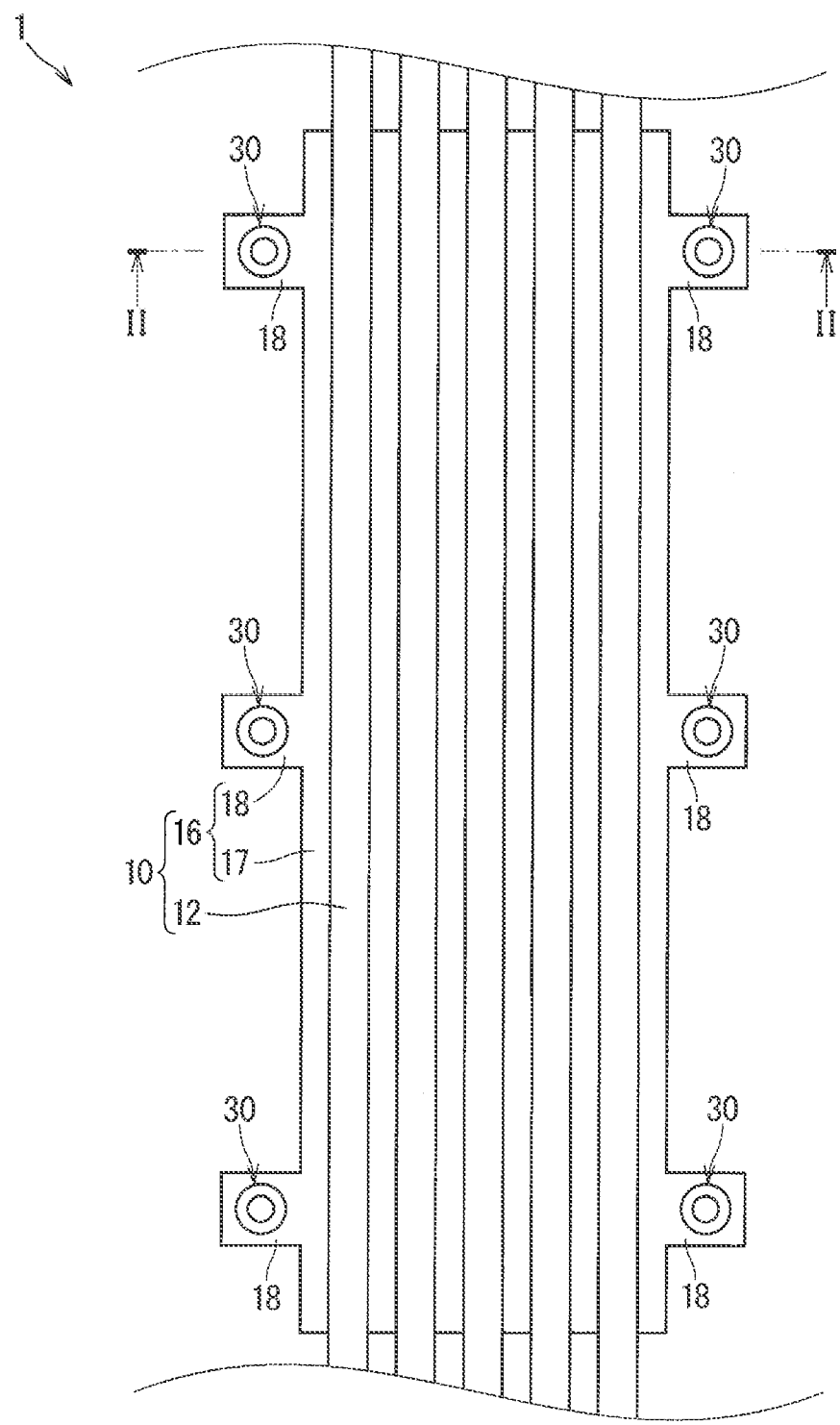
FIG. 1 A plan view illustrating an attachment structure of a wiring member according to an embodiment.
Figure 2:
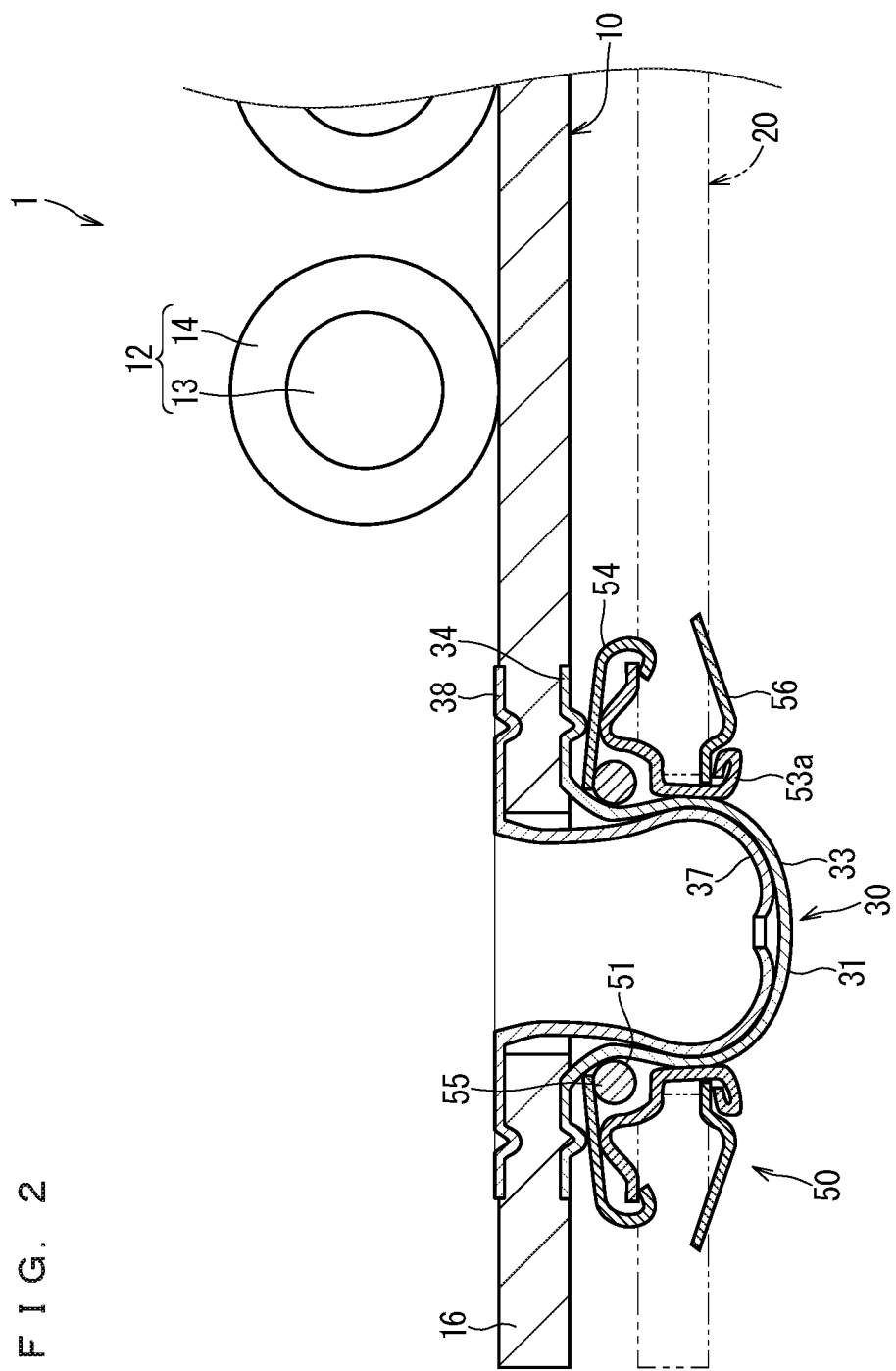
FIG. 2 A cross-sectional view of the wiring member cut along a II-II line in FIG. 1.

An attachment structure of a wiring member according to an embodiment is described hereinafter. FIG. 1 is a plan view illustrating the attachment structure 1 of the wiring member according to the embodiment. FIG. 2 is a cross-sectional view of the wiring member cut along a II-II line in FIG. 1. An illustration of an attaching target member 20 is omitted in FIG. 1.

The attachment structure 1 of the wiring member is used for detachably attaching a wiring member 10 to an attaching target member 20 easily. Specifically, the attachment structure 1 of the wiring member includes the wiring member 10, the attaching target member 20, a convex-shaped part 31, and a concave-shaped part 51 into which the convex-shaped part 31 can be inserted. One of the convex-shaped part 31 and the concave-shaped part 51 is provided in the wiring member 10, and the other one of the convex-shaped part 31 and the concave-shaped part 51 is provided in the attaching target member 20. In the attachment structure 1 of the wiring member, an elastic deformation part 55 is formed in at least one of the convex-shaped part 31 and the concave-shaped part 51. The convex-shaped part 31 and the concave-shaped part 51 are detachably attached easily by the elastic deformation part 55.

The wiring member 10 is mounted to a vehicle to transmit electrical power or light to each component mounted to the vehicle. The wiring member 10 includes a wire-like transmission member 12. Described herein is an example that the wiring member 10 is the flat wiring member 10 including the plurality of wire-like transmission members 12 and a base member 16 keeping the plurality of wire-like transmission members 12 in a flat state.

It is sufficient that the wire-like transmission member 12 is a wire-like member transmitting electrical power or light, for example. For example, the wire-like transmission member 12 may be a general wire having a core wire and a covering around the core wire, or may also be a bare conductive wire, a shielded wire, an enamel wire, a nichrome wire, or an optical fiber.

The wire-like transmission member 12 transmitting the electrical power may be various kinds of signal lines or various kinds of power lines. The wire-like transmission member 12 transmitting the electrical power may be used as an antenna or coil, for example, transmitting or receiving a signal or electrical power to or from a space.

In the description herein, the wire-like transmission member 12 is a general wire 12 (simply referred to as the electrical wire 12 hereinafter). The electrical wire 12 includes a core wire 13 as a transmission wire body and an insulating covering 14 as a covering for covering the core wire 13. Each description on the electrical wire 12 is applicable to each exemplified object of the wire-like transmission member 12 except for a configuration to which the description is not applicable.

The core wire 13 is made up of one or a plurality of strands. The strand is formed of a conductor made of copper, copper alloy, aluminum, or aluminum alloy, for example. When the core wire 13 is made up of the plurality of strands, the plurality of strands may be stranded. The insulating covering 14 is formed of a resin material such as polyvinyl chloride (PVC) or polyethylene (PE) extrusion-molded around the core wire 13. Herein, the electrical wire 12 is a so-called round wire 12 having a round shape in cross section.

The base member 16 is a member holding the electrical wire 12 in a state of two-dimensionally positioning the electrical wire 12. It is sufficient that the base member 16 disposed in an operation position, for example, can hold the electrical wire 12 in the state of being two-dimensionally positioned. Thus, the base member 16 may be a flexible sheet-like member which can be bended easily. The base member 16 may be a sheet-like member having rigidity with a degree of being able to be curved and hold the electrical wire 12 in a state of being two-dimensionally positioned, or may be a sheet-like member having rigidity with a degree of being able to keep itself in a flat state and hold the electrical wire 12 in a state of being two-dimensionally positioned. The base member 16 may have a three-dimensional shaped part such as a part made up of a wall partially standing on the base member 16.

In the description herein, the base member 16 is the sheet member 16 which can be bended. Each description on the sheet member 16 is applicable to the base member 16 except for a configuration to which the description is not applicable.

A material constituting the sheet member 16 is not particularly limited, however, the sheet member 16 is preferably formed of a material containing a resin of polyvinyl chloride (PVC), polyethylene terephthalate (PET), or polypropylene (PP). The sheet member 16 may be the sheet member 16 with an inner portion evenly filled or a non-woven sheet, for example. The sheet member 16 may contain a material such as metal. The sheet member 16 preferably has flexibility of easily bending in a thickness direction. The sheet member 16 may be made up of a single layer or a plurality of stacked layers. When the sheet member 16 is made up of the plurality of stacked layers, it is considered that a resin layer and a resin layer are stacked, for example. It is also considered that a resin layer and a metal layer are stacked, for example.

The electrical wire 12 is fixed to one main surface of the sheet member 16. The electrical wire 12 is fixed along a predetermined route on one main surface of the sheet member 16. In the example illustrated in FIG. 1, the route of the electrical wire 12 on the sheet member 16 forms a straight line, but may also be midway bended. When the plurality of electrical wires 12 are fixed on one main surface of the sheet member 16, the plurality of electrical wires 12 may be or may not be midway branched.

The sheet member 16 is formed into a shape following the route of the plurality of electrical wires 12 described above. At this time, the sheet member 16 includes a band-like part 17 following the route of the electrical wire 12 and an extension part 18 extending to a lateral side of the band-like part 17. The electrical wire 12 is fixed to the band-like part 17. The convex-shaped part 31 or the concave-shaped part 51 is provided in the extension part 18.

Applicable as a state of fixing the electrical wire 12 and the sheet member 16 is a contact area fixation and a non-contact area fixation, or both fixations may be used together. Herein, the contact area fixation indicates that a portion where the electrical wire 12 and the sheet member 16 have contact with each other is stuck and fixed. The non-contact area fixation indicates the fixing state which is not the contact area fixation. For example, a sewing thread, the other sheet member 16, or an adhesive tape presses the electrical wire 12 toward the sheet member 16, or a sewing thread, the other sheet member 16, or an adhesive tape surrounds the electrical wire 12 and the sheet member 16, thereby holding the electrical wire 12 and the sheet member 16 to keep the electrical wire 12 and the sheet member 16 fixed to each other. In the description hereinafter, the electrical wire 12 and the sheet member 16 are in the state of the contact area fixation. Each description on the contact area fixation is also applicable to the non-contact area fixation as long as each member and material has a configuration to which the non-contact area fixation is not applicable.

Applicable as the configuration of the contact area fixation are a contact area indirect fixation and a contact area direct fixation, or both fixations may also be used together in different regions. Herein, the contact area indirect fixation indicates that the electrical wire 12 and the sheet member 16 are indirectly stuck and fixed via an intervening member such as an adhesive agent, a gluing agent, and a double-sided adhesive tape provided therebetween. The contact area direct fixation indicates that the electrical wire 12 and the sheet member 16 are directly stuck and fixed without an intervention of the adhesive agent, for example, which is separately provided. Considered in the contact area direct fixation is that resin included in at least one of the electrical wire 12 and the sheet member 16 is melted, thus the electrical wire 12 and the sheet member 16 are stuck and fixed, for example. In the description hereinafter, the electrical wire 12 and the sheet member 16 are in the state of the contact area direct fixation. Each description on the contact area direct fixation is also applicable to the contact area indirect fixation as long as each member and material has a configuration to which the contact area indirect fixation is applicable.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but various means including a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the electrical wire 12 and the base member 16 are in the state of the contact area direct fixation by these means. Specifically, when the state of the contact area direct fixation is formed by the ultrasonic welding, for example, the electrical wire 12 and the sheet member 16 are in the state of the contact area direct fixation by the ultrasonic welding. A portion where the state of the contact area direct fixation by the heat is formed by the welding (a fixing portion between the electrical wire 12 and the sheet member 16) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the contact area direct fixation, only the resin included in the covering of the electrical wire 12 may be melted, or only the resin included in the sheet member 16 may be melted. In these cases, the resin which has been melted is stuck on an outer surface of the resin on the other side, and a relatively clear interface may be formed in some cases. In the case of the contact area direct fixation, both the resin included in the covering of the electrical wire 12 and the resin included in the sheet member 16 may be melted. In this case, there may be a case where both the resins are mixed and a clear interface is not formed. Particularly, when the covering of the electrical wire 12 and the sheet member 16 include compatible resin such as the same resin material, for example, there may be a case where both the resins are mixed and a clear interface is not be formed.

The attaching target member 20 is an attaching target of the wiring member 10. Described herein is an example that the attaching target member 20 is a vehicle body. The vehicle body is a frame, a panel, and a reinforcement member, for example. In the example illustrated in FIG. 2, the attaching target member 20 is a flat panel 20. An attaching hole 20h is formed in the attaching target member 20.

Described herein is an example that the convex-shaped part 31 is provided in the wiring member 10 and the concave-shaped part 51 is provided in the attaching target member 20. Described herein is an example that a male attaching member 30 is provided as a member including the convex-shaped part 31 separately from the wiring member 10 and the attaching target member 20. Further described herein is an example that a female attaching member 50 corresponding to the male attaching member 30 is provided as a member including the concave-shaped part 51 separately from the wiring member 10 and the attaching target member 20. Particularly described herein is an example that the male snap fastener 30 is adopted as the male attaching member 30 and the female snap fastener 50 corresponding to the male snap fastener 30 is adopted as the female attaching member 50. The snap fastener is a member also referred to as a snap button, for example, and a member used as a snap snapping a portion where fabrics overlap with each other in a clothing usage, for example, can be used as a pair of the male snap fastener 30 and the female snap fastener 50. That is to say, in the description herein, a convex snap in the snaps having the concave portion and the convex portion in a pair is the male snap fastener 30 and a convex snap is the female snap fastener 50. The male snap fastener 30 includes a first attachment structure part in addition to the convex-shaped part 31. The first attachment structure part is a part for attaching the male snap fastener 30 itself to a member (the wiring member 10 herein) provided with the convex-shaped part 31. Described herein is an example that the first attachment structure part is formed into a shape capable of sandwiching the wiring member 10.

The male snap fastener 30 is attached to the sheet member 16 in the wiring member 10. The male snap fastener 30 is attached to the extension part 18 of the sheet member 16. The male snap fastener 30 is attached to the extension part 18 using a through hole 18h formed in the extension part 18. Accordingly, described in the present example is an example that the first attachment structure part is formed to sandwich a peripheral part of the through hole 18h of the extension part 18.

Figure 3:
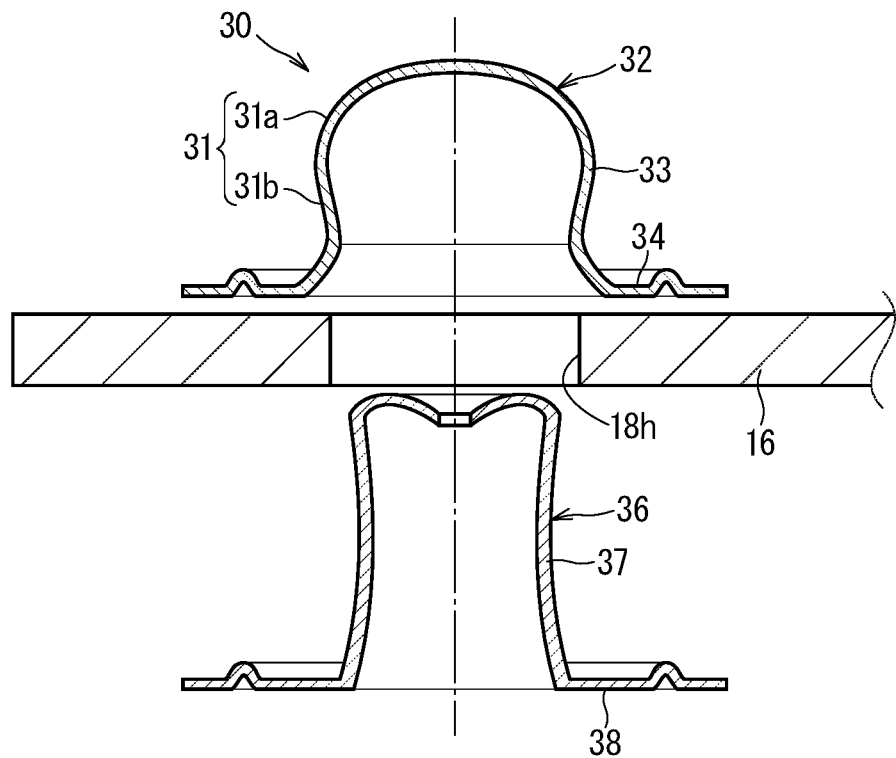
FIG. 3 An exploded cross-sectional view of a male snap fastener.

FIG. 3 is an exploded cross-sectional view of the male snap fastener 30.

Specifically, the male snap fastener 30 is made up of a plurality of components molded separately from each other, herein. In the example illustrated in FIG. 3, the male snap fastener 30 is made up of a male body part 32 and a snap 36 molded separately from each other. The male snap fastener 30 is made of metal or resin, for example.

The male body part 32 includes a fitting head part 33 for attaching the male snap fastener 30 to the female snap fastener 50 and a flange part 34 spreading from a base end portion of the fitting head part 33 to an outer peripheral side. Herein, the fitting head part 33 is formed into a cylindrical shape.

The snap 36 includes an attaching head part 37 passing through a member (the sheet member 16 herein) which is an attaching target of the male snap fastener 30 and inserted into the fitting head part 33 and a flange part 38 spreading from a base end portion of the attaching head part 37 to an outer peripheral side.

Herein, the sheet member 16 is sandwiched between the flange parts 34 and 38, thus the male snap fastener 30 is attached to the wiring body 10. At this time, the attaching head part 37 passing through the sheet member 16 is inserted into the fitting head part 33, thus maintained is a state where the sheet member 16 is partially sandwiched between the flange parts 34 and 38. More specifically, a tip end portion of the attaching head part 37 is swaged when the attaching head part 37 passing through the sheet member 16 is inserted into the fitting head part 33, and is plastically deformed into a shape corresponding to an inner surface shape of the fitting head part 33. For example, the tip end portion of the attaching head part 37 inserted into the fitting head part 33 has direct contact with an inner surface of the fitting head part 33 in a state where an outer surface of the fitting head part 33 is supported by a jig, for example, and is subsequently elastically deformed into the inner surface shape of the fitting head part 33 upon receiving force from the inner surface of the fitting head part 33. Accordingly, the detent of the attaching head part 37 returning from the fitting head part 33 is achieved, thus the state where the flange parts 34 and 38 sandwich the wiring member 10 is maintained.

Accordingly, the sandwiching structure by the flange parts 34 and 38 and the detent structure of the attaching head part 37 returning from the fitting head part 33 for maintaining the sandwiching structure in the male snap fastener 30 can be deemed as a first attachment structure part for attaching the male snap fastener 30 to the wiring member 10. In the male snap fastener 30, the fitting head part 33 and the attaching head part 37 constitute the convex-shaped part 31.

Figure 4:
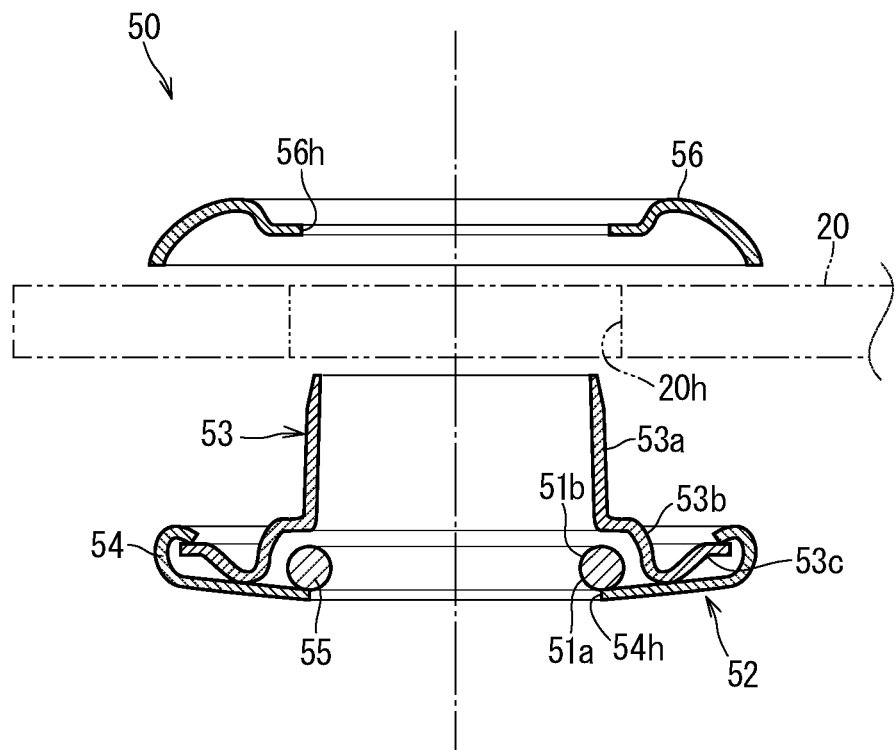
FIG. 4 An exploded cross-sectional view of a female snap fastener.

FIG. 4 is an exploded cross-sectional view of the female snap fastener 50.

The female snap fastener 50 includes a second attachment structure part in addition to the concave-shaped part 51. The second attachment structure part is a part for attaching the female snap fastener 50 itself to a member to which the concave-shaped part 51 is attached (the attaching target member 20 herein). Specifically, the female snap fastener 50 is made up of a plurality of components molded separately from each other, herein. In the example illustrated in FIG. 4, the female snap fastener 50 is made up of a female body part 52 and a receiving part 56 molded separately from each other. The female snap fastener 50 is made of metal or resin, for example.

The female body part 52 includes a cylindrical body 53, a holding plate 54, and a ring spring 55. The cylindrical body 53, the holding plate 54, and the ring spring 55 are members molded separately from each other. In the female body part 52, a hole part continuously formed in the cylindrical body 53, the holding plate 54, and the ring spring 55 is the concave-shaped part 51.

As illustrated in FIG. 4, in the cylindrical body 53, a small cylindrical part 53a, a large cylindrical part 53b having a larger diameter than the small cylindrical part 53a, and a flange part 53c having a larger diameter than the large cylindrical part 53b are formed into a continuous shape continuing from one side to the other side in an axial direction in a state before the female snap fastener 50 is attached to the attaching target member 20. The small cylindrical part 53a is a part swaged and plastically deformed when the female snap fastener 50 is attached to the attaching target member 20. Herein, the small cylindrical part 53a has a length dimension and a diameter dimension large enough to pass through the attaching hole 20h formed in the attaching target member 20 of the female snap fastener 50. The ring spring 55 is housed inside the large cylindrical part 53b. A level difference part is generated between the large cylindrical part 53b and the small cylindrical part 53a to prevent the ring spring 55 from coming out of the large cylindrical part 53b. The flange part 53c is a part held by the holding plate 54.

In the holding plate 54, a through hole 54h coaxial with the small cylindrical part 53a is formed in a center of a circular plate-like member and an outer peripheral part is reflexed and deformed to hold the flange part 53c. The through hole 54h of the holding plate 54 is set smaller than an outer diameter of the ring spring 55. Accordingly, the detent of the ring spring 55 can be achieved in the state where the holding plate 54 is held by the flange part 53c.

The ring spring 55 is the elastic deformation part 55 described above. The convex-shaped part 31 is inserted into the ring spring 55, thus the ring spring 55 can also be deemed as a part of the concave-shaped part 51. In a natural state, the outer diameter of the ring spring 55 is formed smaller than an inner diameter of the large cylindrical part 53b. Accordingly, the ring spring 55 can be elastically deformed to spread to an outer peripheral side. In a natural state, an inner diameter of the ring spring 55 is formed smaller than an inner diameter of the small cylindrical part 53a and through hole 54h of the holding plate 54. Accordingly, an inner peripheral part of the ring spring 55 is the narrowest part in the concave-shaped part 51.

The receiving part 56 is formed into a circular plate-like shape, for example. A through hole 56h into which the small cylindrical part 53a can be inserted is formed in the receiving part 56.

The female snap fastener 50 is attached to the attaching target member 20 as follows. That is to say, in a state where the female body part 52 is located on one side of the attaching target member 20 and the receiving part 56 is located on the other side of the attaching target member 20, the small cylindrical part 53a of the female body part 52 passes through the attaching hole 20h formed in the attaching target member 20 and the through hole 56h formed in the receiving part 56. Then, the tip end portion of the small cylindrical part 53a of the female body part 52 passing through the attaching hole 20h formed in the attaching target member 20 and the through hole 56h formed in the receiving part 56 is swaged and plastically deformed to press a rear surface of the receiving part 56.

A sandwiching structure by the female body part 52 and the receiving part 56 and a swage structure of the female body part 52 for maintaining the sandwiching structure in the female snap fastener 50 can be deemed as a second attachment structure part for attaching the female snap fastener 50 to the attaching target member 20.

The convex-shaped part 31 includes a first insertion part 31a formed to be gradually widened from a tip end side to a back end side in an insertion direction of being inserted into the concave-shaped part 51 and a second insertion part 31b located closer to the back end side in the insertion direction of being inserted into the concave-shaped part 51 in relation to the first insertion part and formed to be gradually narrowed from the tip end side to the back end side in the insertion direction of being inserted into the concave-shaped part 51. A portion formed to be widest in the convex-shaped part 31 is located between the first insertion part 31a and the second insertion part 31b.

The concave-shaped part 51 includes a first inserted part 51a formed to be gradually widened from a tip end side to a back end side in which the convex-shaped part 31 is inserted and a second inserted part 51b located farther from the back end side in the insertion direction of the convex-shaped part 31 in relation to the first inserted part 51a and formed to be gradually narrowed from the tip end side to the back end side in the insertion direction of the convex-shaped part 31. Herein, the ring spring 55 is formed into a circular shape in cross section, thus the first inserted part 51a and the second inserted part 51b are formed side by side in an axial direction in an inner peripheral portion of the ring spring 55.

When the convex-shaped part 31 is inserted into the concave-shaped part 51 upon receiving force toward a first direction, the elastic deformation part 55 is elastically deformed by the force toward the first direction to fit the convex-shaped part 31 to the concave-shaped part 51. When the convex-shaped part 31 is pulled from the concave-shaped part 51 upon receiving force toward a second direction opposite to the first direction, the elastic deformation part 55 is elastically deformed by the force toward the second direction in a direction similar to the case of receiving the force toward the first direction, and releases the fitting state of the convex-shaped part 31 and the concave-shaped part 51.

The elastic deformation part 55 is provided in the concave-shaped part 51. The elastic deformation part 55 is formed to be able to widen the concave-shaped part 51 at the time of inserting the first insertion part 31a in attaching the convex-shaped part 31 and the concave-shaped part 51 and narrowing the concave-shaped part 51 at the time of inserting the second insertion part 31b. The elastic deformation part 55 is formed to be able to widen the concave-shaped part 51 at the time of inserting the second insertion part 31b in releasing the attachment of the convex-shaped part 31 and the concave-shaped part 51.

More specifically, the ring spring 55 is provided as the elastic deformation part 55 herein. Then, in attaching the convex-shaped part 31 and the concave-shaped part 51, that is to say, in attaching the male snap fastener 30 and the female snap fastener 50, the ring spring 55 is widened by the first insertion part 31a when the first insertion part 31a of the convex-shaped part 31 is inserted into the ring spring 55. Then, after the convex-shaped part 31 passes through the first insertion part 31a, the ring spring 55 is elastically recovered and narrowed when the second insertion part 31b is inserted. Accordingly, the ring spring 55 is fitted in a hollow part of the convex-shaped part 31 for retaining and detent, and the male snap fastener 30 and the female snap fastener 50 are attached to each other.

In contrast, in releasing the attachment of the convex-shaped part 31 and the concave-shaped part 51, that is to say, in releasing the attachment of the male snap fastener 30 and the female snap fastener 50, the ring spring 55 is widened by the second insertion part 31b when the second insertion part 31b of the convex-shaped part 31 is inserted into the ring spring 55. Accordingly, the convex-shaped part 31 can pass through the ring spring 55, and when the convex-shaped part 31 passes therethrough, the attachment of the male snap fastener 20 and the female snap fastener 50 is released. After the second insertion part 31b of the convex-shaped part 21 passes through the ring spring 55, the ring spring 55 is elastically recovered and narrowed when the first insertion part 31a is inserted. Accordingly, the male snap fastener 30 and the female snap fastener 50 can be attached to each other again.

According to the attachment structure 1 of the wiring member having the above configuration, when the convex-shaped part 31 is inserted into the convex-shaped part 51 and when the convex-shaped part 31 is pulled from the concave-shaped part 51, the same elastic deformation part 55 is elastically deformed in the similar manner. Accordingly, the wiring member 10 can be easily detached from the attaching target member 20.

The male snap fastener 30 is provided as the member including the convex-shape part 31, the wiring member 10 can be attached to the attaching target member 20 using the male snap fastener 30.

The female snap faster 50 corresponding to the male snap fastener 30 is provided as the member including the con-cave-shape part 51, thus the wiring member 10 can be attached to the attaching target member 20 using the male snap fastener 30 and the female snap fastener 50 corresponding to the male snap fastener 30.

The convex-shaped part 31 and the concave-shaped part 51 can be fitted to each other by the elastic deformation part 55 provided in the concave-shaped part 51.

The wiring member 10 is the flat wiring member 10, thus the flat wiring member 10 can be detachably attached to the attaching target member 20. The attaching target member 20 is the vehicle body, thus the wiring member 10 can be attached to the vehicle body by the convex-shaped part 31 and the concave-shaped part 51.

Modification Example

FIGS. 5 to 8 are plan views each illustrating a modification example of a position where the attaching member is provided in the wiring member. In FIGS. 5 to 8, the male snap fastener 30 is attached to the wiring member as the attaching member.

Figure 5:
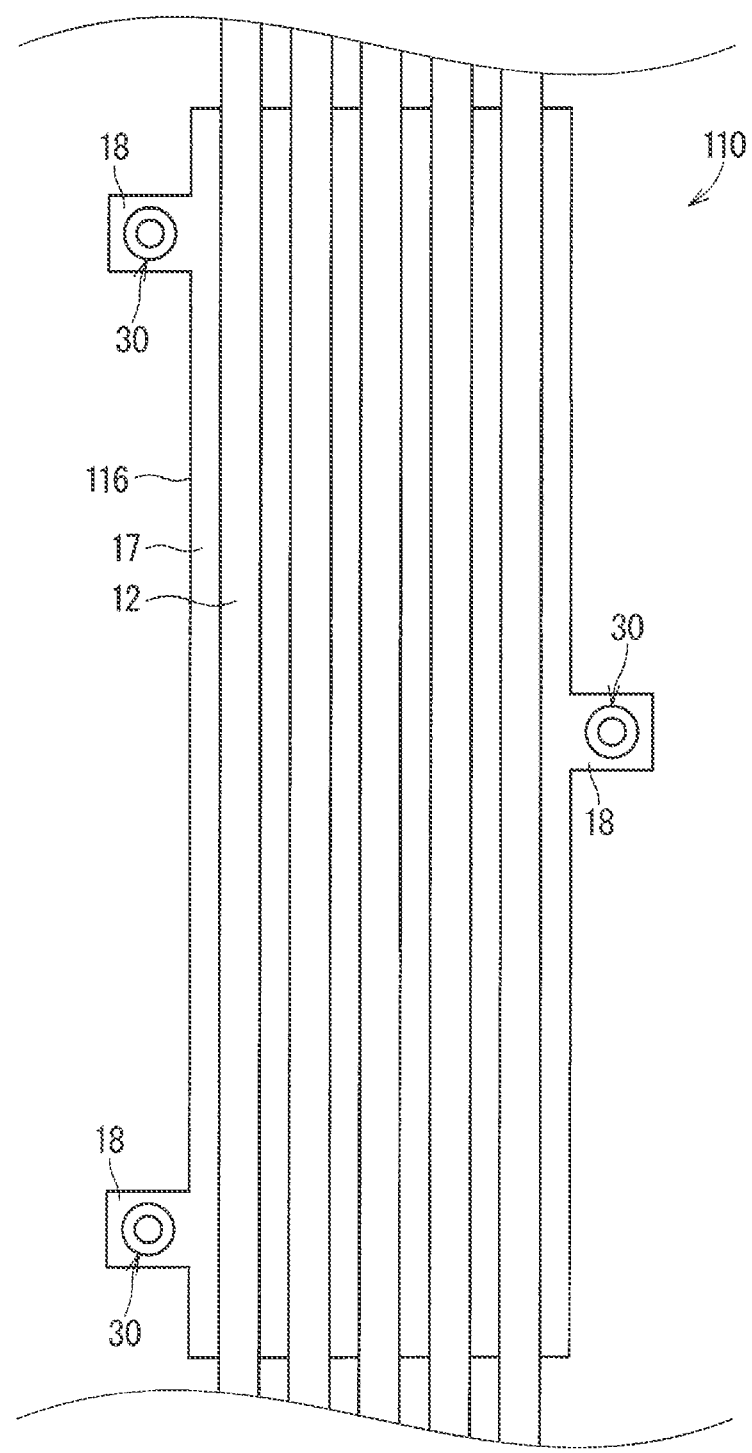
FIG. 5 A plan view illustrating a modification example of a position where an attaching member is provided in the wiring member.

In the above description, the male snap fastener 30 is provided on both sides of the wiring member 10 in one position along a longitudinal direction of the wire-like transmission member 12, however, this configuration is not necessary. As illustrated in FIG. 5, the male snap fastener 30 may be provided only on one side of the wiring member 110 in one position along the longitudinal direction of the wire-like transmission member 12. In this case, the extension part 18 where the male snap fastener 30 is not provided may be omitted in the sheet member 116. In this case, it is sufficient that the male snap fastener 30 is provided on the other one side of the wire-like transmission member 12 in the other position along the longitudinal direction. Furthermore, it is sufficient that the male snap fastener 30 is provided in a jig-zag form along the longitudinal direction of the wire-like transmission member 12 as illustrated in FIG. 5.

Figure 6:
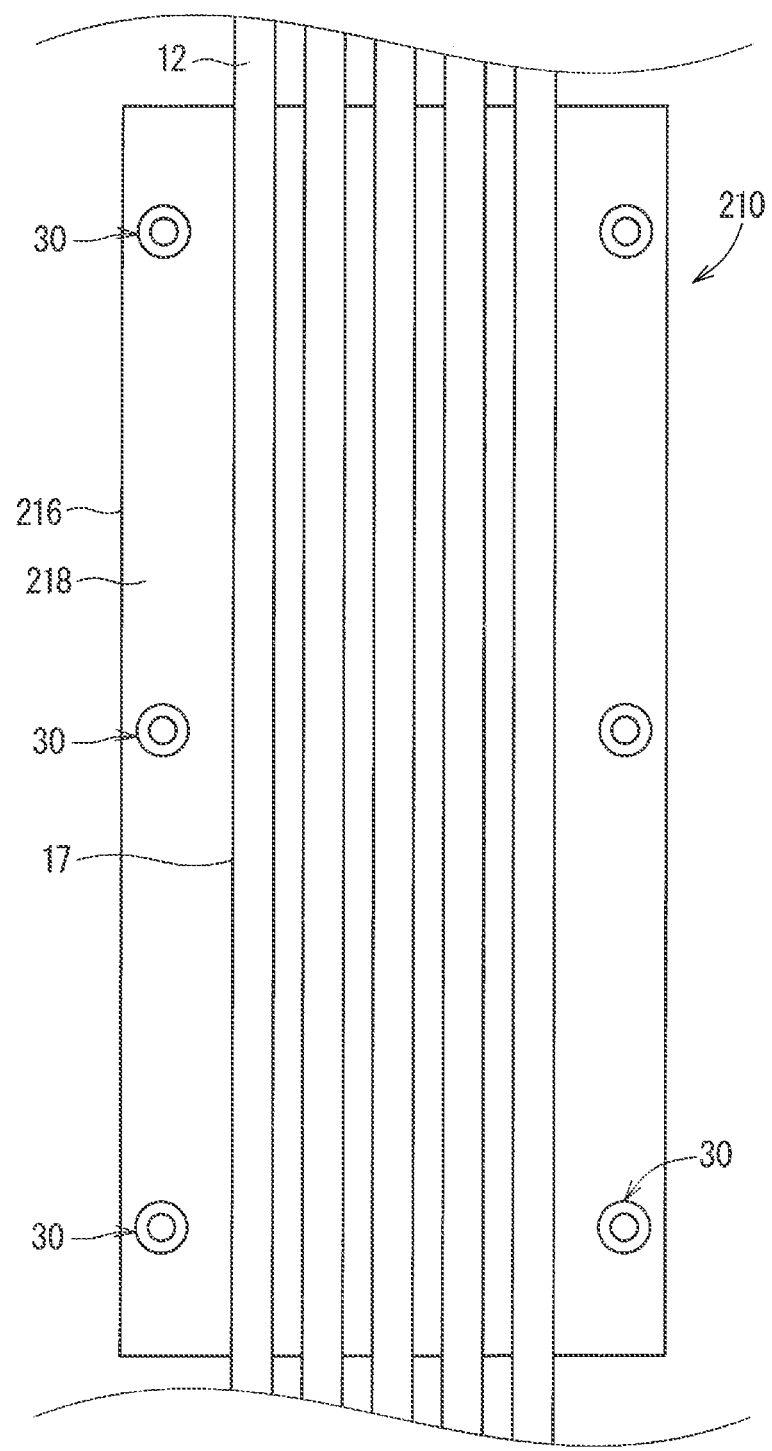
FIG. 6 A plan view illustrating a modification example of a position where the attaching member is provided in the wiring member.

In the above description, the extension part 18 provided to protrude to the lateral side from the band-like part 17 is formed to have the size corresponding to the size of the male snap fastener 30 in the sheet member 16, however, this configuration is not necessary. As illustrated in FIG. 6, an extension part 218 in a sheet member 216 may be continuously formed along the longitudinal direction of the wire-like transmission member 12 as with the band-like part 17. In this case, the sheet member 216 may be formed into a large band-like shape.

Figure 7:
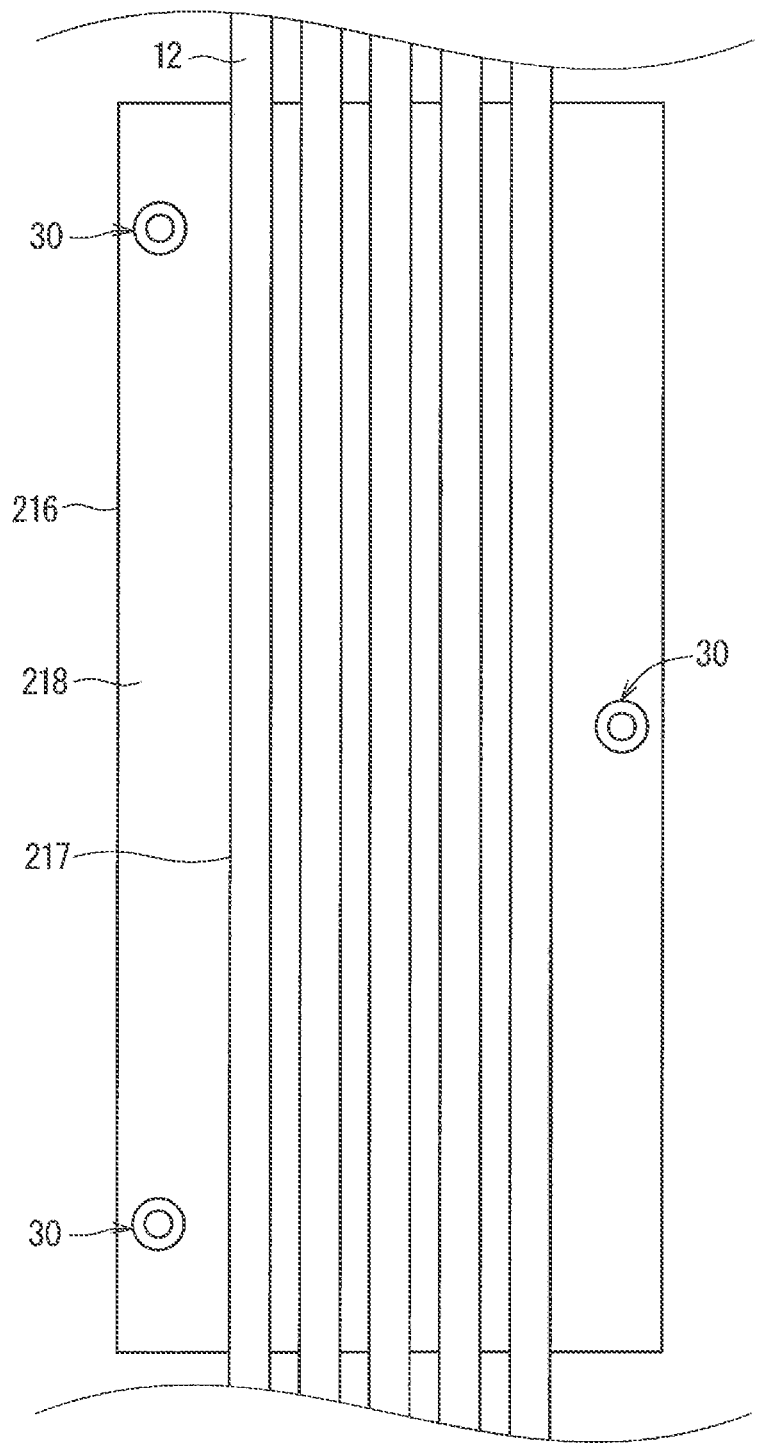
FIG. 7 A plan view illustrating a modification example of a position where the attaching member is provided in the wiring member.

As illustrated in FIG. 7, it is also applicable that the male snap fastener 30 is provided only one side of the wire-like transmission member 12 in one position along the longitudinal direction as is the case illustrated in FIG. 5 in relation to the extension part 218 continuously formed along the longitudinal direction of the wire-like transmission member 12.

Figure 8:
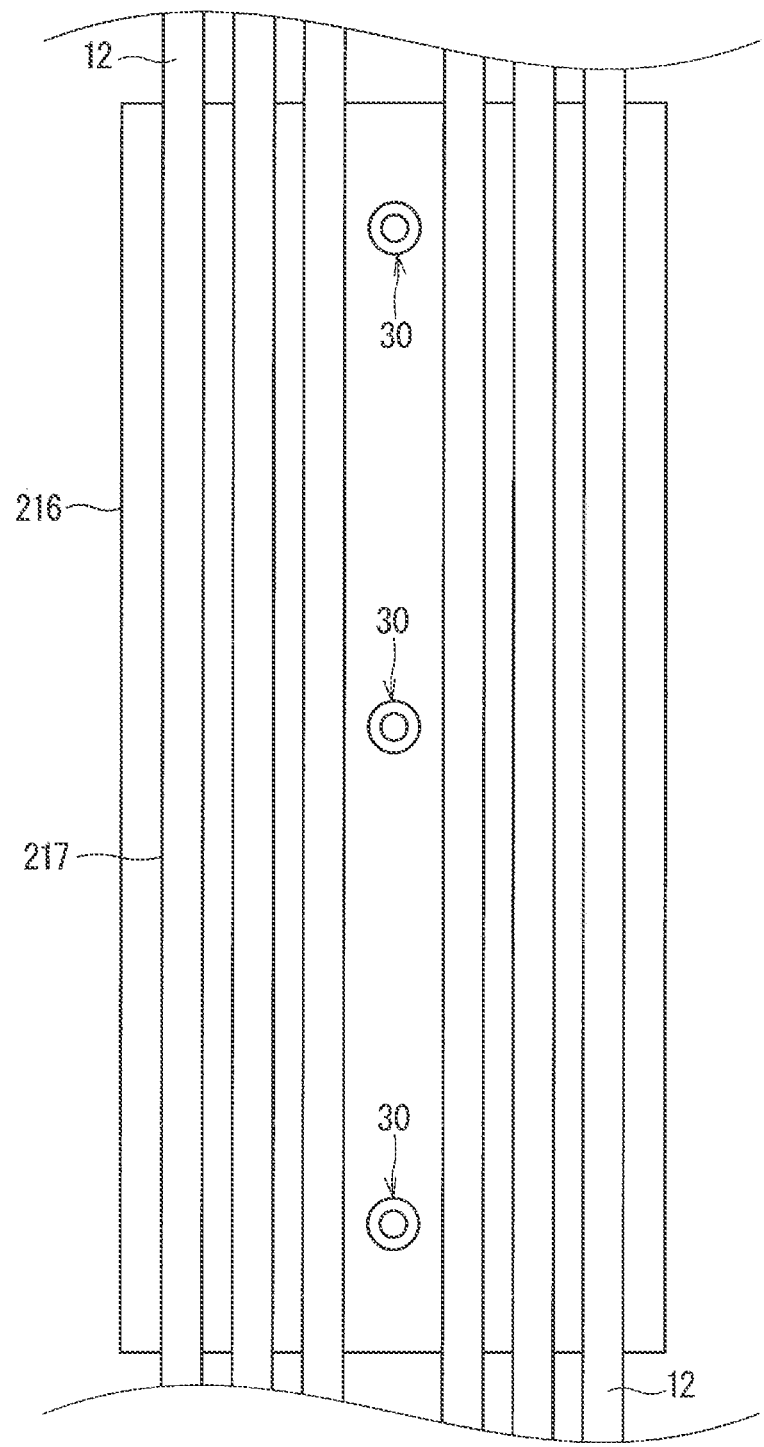
FIG. 8 A plan view illustrating a modification example of a position where the attaching member is provided in the wiring member.

In the above description, the male snap fastener 30 is provided on the outer lateral side of the wire-like transmission member 12 in one position along the longitudinal direction of the wire-like transmission member 12, however, this configuration is not necessary. As illustrated in FIG. 8, the male snap fastener 30 may be provided between the wire-like transmission members 12.

Figure 9:
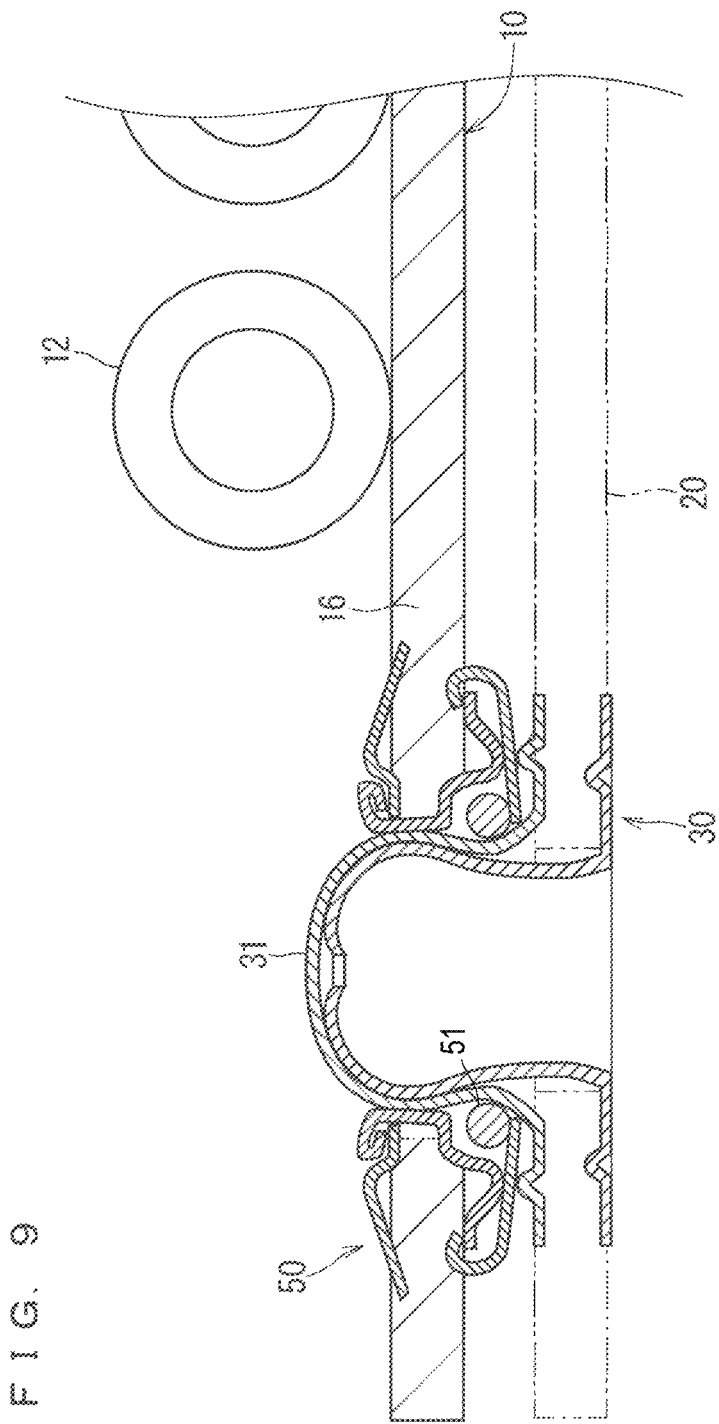
FIG. 9 A cross-sectional view illustrating an example that a concave-shaped part is provided in the wiring member and a convex-shaped part is provided in the attaching target member.

FIG. 9 is a cross-sectional view illustrating an example that the concave-shaped part 51 is provided in the wiring member 10 and the convex-shaped part 31 is provided in the attaching target member 20. The example illustrated in FIG. 9 indicates a case example that the female snap fastener 50 is provided in the wiring member 10 and the male snap fastener 30 is provided in the attaching target member 20. In this manner, it is also applicable that the concave-shaped part 51 is provided in the wiring member 10 and the convex-shaped part 31 is provided in the attaching target member 20.

Figure 10:
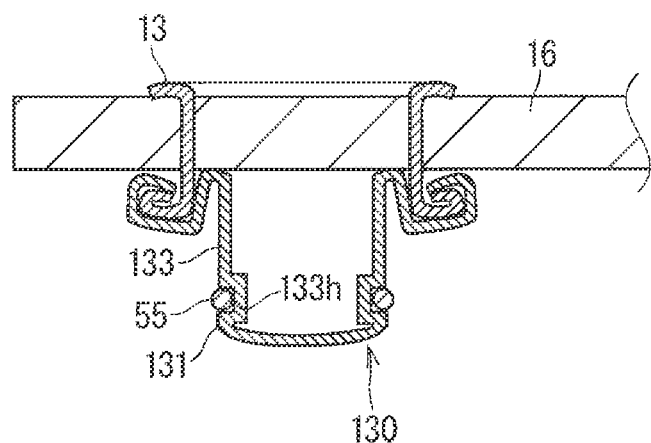
FIG. 10 A cross-sectional view illustrating a modification example of the male snap fastener.
Figure 11:
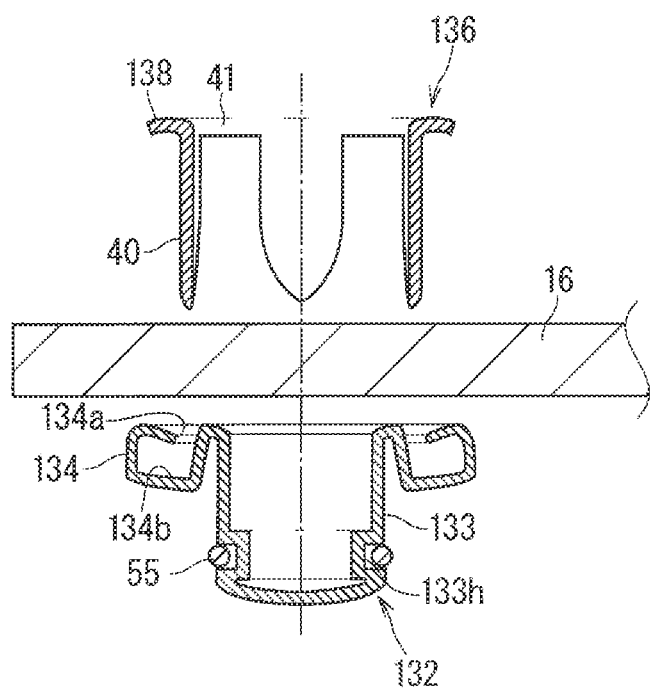
FIG. 11 An exploded cross-sectional view illustrating a modification example of the male snap fastener.

FIG. 10 is a cross-sectional view illustrating a modification example of the convex-shaped part 31. FIG. 11 is an exploded cross-sectional view illustrating a modification example of the convex-shaped part 31. In the examples illustrated in FIG. and FIG. 11, the shape of the male snap fastener 130 is different from a shape of the male snap fastener 30 described above.

The male snap fastener 130 is made up of a plurality of components including a male body part 132, the ring spring 55 which is the elastic deformation part 55, and a snap 136.

The male body part 132 includes a fitting head part 133 and a flange part 134 connected to a base end portion of the fitting head part 133. The fitting head part 133 is formed into a cylindrical shape. A peripheral groove 133h is formed in an outer surface of the cylindrical fitting head part 133. The ring spring 55 is housed in the peripheral groove 133h. The fitting head part 133 and the ring spring 55 constitute the convex-shaped part 131. The elastic deformation part 55 may be provided in the convex-shaped part 131 as with the present example. The flange part 134 is provided to protrude to a lateral side from the base end portion of the fitting head part 133. The flange part 134 includes an opening part 134a into which a tip end of the snap 136 passing through the sheet member 16 is inserted and a receiving plate part 134b plastically deforms the tip end of the snap 136 passing through the opening part 134a, and is formed so that the tip end of the snap 136 passing through the sheet member 16 is plastically deformed and housed therein.

The ring spring 55 housed in the peripheral groove 133h protrudes to an outer side from the fitting head part 133 in a natural state. The ring spring 55 is housed in the peripheral groove 133h so as to be able to be elastically deformed to be narrowed. The elastic deformation part 55 provided in the convex-shaped part 131 is formed to be able to narrow the convex-shaped part 131 at the time of inserting the convex-shaped part 131 into the concave-shaped part 151 and widen the convex-shaped part 131 at the time of inserting the convex-shaped part 31 into the concave-shaped part 151.

The snap 136 includes a plurality of claw parts 40 provided separately from each other in a circumferential direction, a connection part 41 connecting a base end portion of the plurality of claw parts 40, and a flange part 138 formed to spread to an outer peripheral side of the connection part 41. A tip end portion of the claw part 40 is formed into a sharp shape to be able to pass through a part of the sheet member 16 with no hole before being attached to the sheet member 16. The claw part 40 passes through the sheet member 16, thus the through hole is formed in the sheet member 16. The tip end portion of the claw part 40 passing through the sheet member 16 is plastically deformed and housed in the flange part 134. Accordingly, the sheet member 16 is sandwiched by the flange parts 134 and 138, thus the male snap fastener 130 is attached to the sheet member 16.

Figure 12:
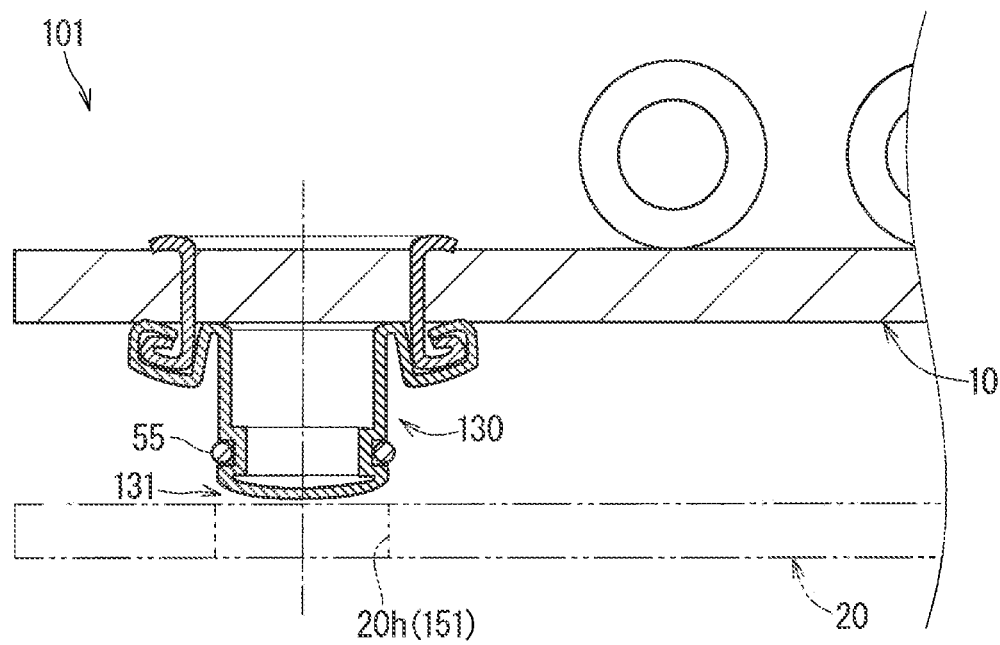
FIG. 12 An exploded cross-sectional view illustrating an attachment structure of a wiring member using a male snap fastener according to a modification example.

FIG. 12 is an exploded cross-sectional view illustrating an attachment structure 101 of a wiring member using a male snap fastener 130 according to a modification example. In the example illustrated in FIG. 12, the male snap fastener 130 is provided in the wiring member 10. The attaching hole 20h formed in the attaching target member and the peripheral part thereof are used as a concave-shaped part 151. For example, when the attaching target member 20 is a member formed of a rigid material such as metal or a rigid plastic, it is also considered that a snap fastener is not attached to the attaching target member 20 but the attaching target member 20 partially constitutes the convex-shaped part or the concave-shaped part as with the example illustrated in FIG. 12.

In the case of the example illustrated in FIG. 12, a diameter of the attaching hole 20h is formed smaller than the outer diameter of the ring spring 55 in the natural state. Accordingly, when the convex-shaped part 131 of the male snap fastener 130 is inserted into the attaching hole 20h formed in the attaching target member 20, the ring spring 55 has direct contact with a peripheral surface of the attaching hole 20h and is narrowed, thereby being able to pass through the attaching hole 20h. Then, the ring spring 55 passing through the attaching hole 20h is elastically recovered, and the convex-shaped part 131 and the concave-shaped part 151 are fitted to each other.

Figure 13:
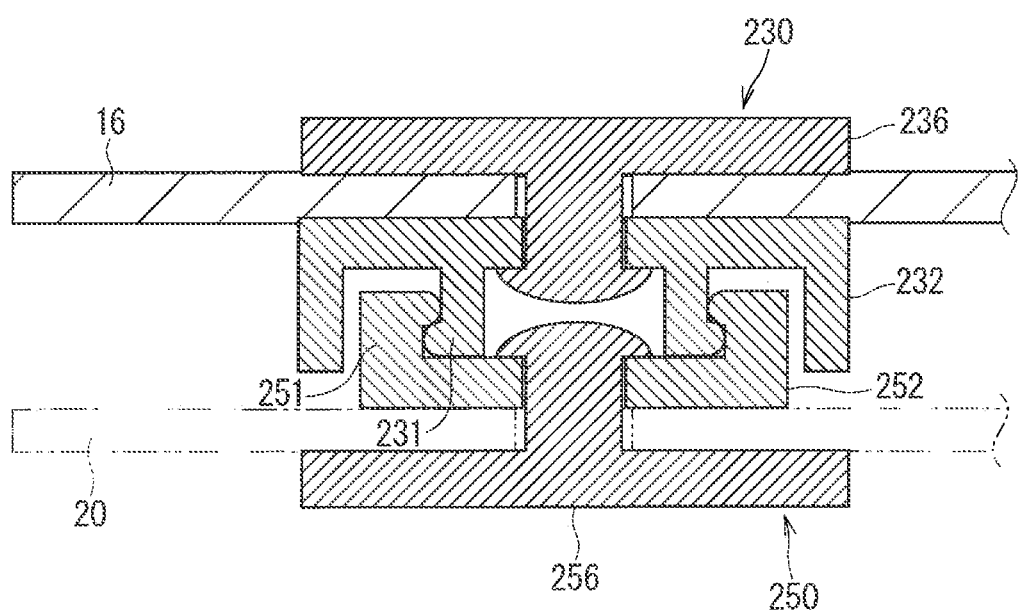
FIG. 13 A cross-sectional view illustrating a modification example of a convex-shaped part, a concave-shaped part, and an elastic deformation part.
Figure 14:
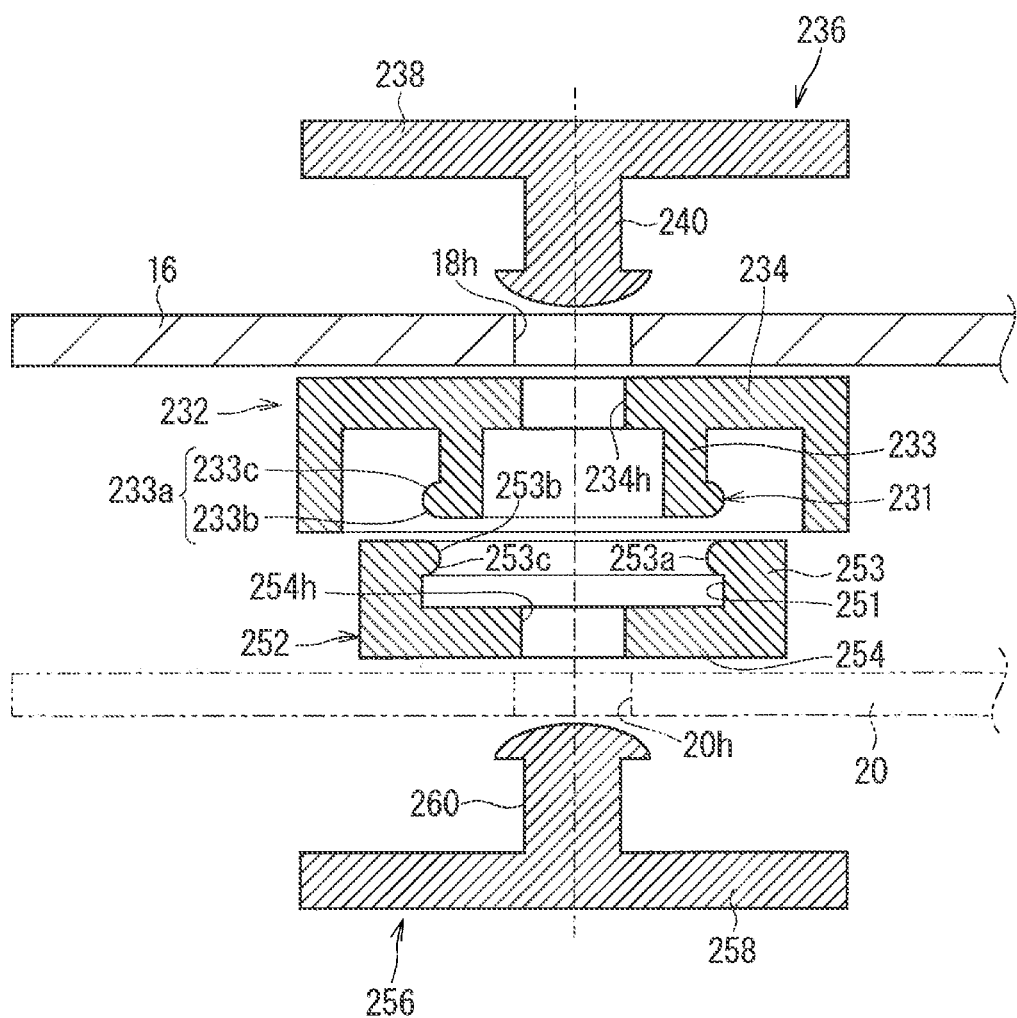
FIG. 14 An exploded cross-sectional view illustrating a modification example of the convex-shaped part, the concave-shaped part, and the elastic deformation part.

FIG. 13 is a cross-sectional view illustrating a modification example of the convex-shaped part 31, the concave-shaped part 51, and the elastic deformation part. FIG. 14 is an exploded cross-sectional view illustrating a modification example of the convex-shaped part 31, the concave-shaped part 51, and the elastic deformation part.

In the examples illustrated in FIG. 13 and FIG. 14, a shape of a male snap fastener 230 is different from a shape of each of the male snap fasteners 30 and 130 described above. A shape of a female snap fastener 250 is different from the shape of the female snap fastener 50 described above.

The male snap fastener 230 includes a male body part 232 and a snap 236. Herein, the male body part 232 and the snap 326 are locked using elastic deformation, and the male snap fastener 230 is attached to the sheet member 16.

The male body part 232 includes a fitting head part 233 having a cylindrical shape and a substrate 234 on which the fitting head part 233 stands. The fitting head part 233 is the convex-shaped part 231. A protrusion 233a is formed in an outer peripheral surface of a tip end of the fitting head part 233. The protrusion 233a includes a first insertion part 233b and a second insertion part 233c located closer to a base end side of the fitting head part 233 in relation to the first insertion part 233b. The first insertion part 233b is a part gradually widened from a tip end side to the base end side of the fitting head part 233. The second insertion part 233c is a part gradually narrowed from the tip end side to the base end side of the fitting head part 233. A through hole 234h is formed in the substrate 234. The fitting head part 233 is provided in a position other than a peripheral part of the through hole 234h in the substrate 234.

The snap 236 includes a substrate 238 and a claw part 240 standing on the substrate 238. A tip end of the claw part 240 is formed to be able to be inserted into and locked to the through hole 234h formed in the substrate 234 of the male body part 232. The tip end of the claw part 240 is inserted into and locked to the through hole 234h of the male body part 232 in a state where the sheet member 16 is sandwiched between the substrate 234 of the male body part 232 and the substrate 238 of the snap 236, thus the male snap fastener 230 is attached to the base member 16.

The female snap fastener 250 includes a female body part 252 and a snap 256. Herein, the female body part 252 and the snap 256 are locked using elastic deformation, and the female snap fastener 250 is attached to the attaching target member 20.

The female body part 252 includes a cylindrical body 253 having a cylindrical shape and a substrate 254 on which the cylindrical body 253 stands. The cylindrical body 253 is formed larger than the fitting head part 233, and the fitting head part 233 can be inserted into the cylindrical body 253. Accordingly, the cylindrical body 253 is a concave-shaped part 251. A protrusion 253a is formed in an inner peripheral surface of a tip end of the cylindrical body 253. The protrusion 253a includes a first inserted part 253b and a second inserted part 253c located closer to a base end side of the cylindrical body 253 in relation to the first inserted part 253b. The first inserted part 253b is a part gradually narrowing a width of an opening from an opening side (a tip end side of the cylindrical body 253) toward a back side (a base end side of the cylindrical body 253). The second inserted part 253c is a part gradually widening the width of the opening from the opening side toward the back side. A through hole 254h is formed in the substrate 254. The cylindrical body 253 is provided in a position other than a peripheral part of the through hole 254h in the substrate.

The snap 256 includes a substrate 258 and a columnar claw part 260 standing on the substrate 258. A tip end of the claw part 260 is formed wider than a base end thereof, and is formed to be able to be inserted into and locked to the through hole 254h formed in the substrate 254 of the female body part 252. The tip end of the claw part 260 is inserted into and locked to the through hole 254h in a state where the attaching target member 20 is sandwiched between the substrate 254 of the female body part 252 and the substrate 258 of the snap 256, thus the female snap fastener 250 is attached to the attaching target member 20.

When the convex-shaped part 231 is inserted into the concave-shaped part 251, the protrusions 233a and 253a, more specifically, the first insertion part 233b in the protrusion 233a and the first inserted part 253b in the protrusion 253a have contact with each other. At this time, the part of the fitting head part 233 closer to the base end side in relation to the protrusion 233a is elastically deformed, and the part of the fitting head part 233 where the protrusion 233a is located is directed to the inner peripheral side. The part of the cylindrical body 253 closer to the base end side in relation to the protrusion 253a is elastically deformed, and the part of the cylindrical body 253 where the protrusion 253a is located is directed to the outer peripheral side. Accordingly, the protrusions 233a and 253a pass through each other and are elastically recovered after passing through each other, thus the convex-shaped part 231 is fitted to the concave-shaped part 251.

When the convex-shaped part 231 is pulled from the concave-shaped part 251, the protrusions 233a and 253a, more specifically, the second insertion part 233c in the protrusion 233a and the second inserted part 253c in the protrusion 253a have contact with each other firstly. At this time, the part of the fitting head part 233 closer to the base end side in relation to the protrusion 233a is elastically deformed, and the part of the fitting head part 233 where the protrusion 233a is located is directed to the inner peripheral side. The part of the cylindrical body 253 closer to the base end side in relation to the protrusion 253a is elastically deformed, and the part of the cylindrical body 253 where the protrusion 253a is located is directed to the outer peripheral side. Accordingly, the protrusions 233a and 253a pass through each other, and the convex-shaped part 31 is detached from the concave-shaped part 51.

In the present example, the fitting head part 233 which is the convex-shaped part 231 and the cylindrical body 253 which is the concave-shaped part 251 are formed to be able to be elastically deformed. That is to say, in the present example, the elastic deformation part is formed integrally with both the convex-shaped part 231 and the concave-shaped part 251. In this manner, the elastic deformation part may be formed integrally with the convex-shaped part, the concave-shaped part, or both of them. The elastic deformation part may be formed on both the convex-shaped part and the concave-shaped part as with the present example.

In the present example, the male snap fastener 30 and the female snap fastener 50 are elastically deformed and attached to the wiring member 10 and the attaching target member 20. In this manner, the male snap fastener 30 and the female snap fastener 50 may be attached to the wiring member 10 and the attaching target member 20 by a state other than the plastic deformation. For example, the male snap fastener 30 and the female snap fastener 50 may be attached to the wiring member 10 and the attaching target member 20 by sewing or adhesion.

Figure 15:
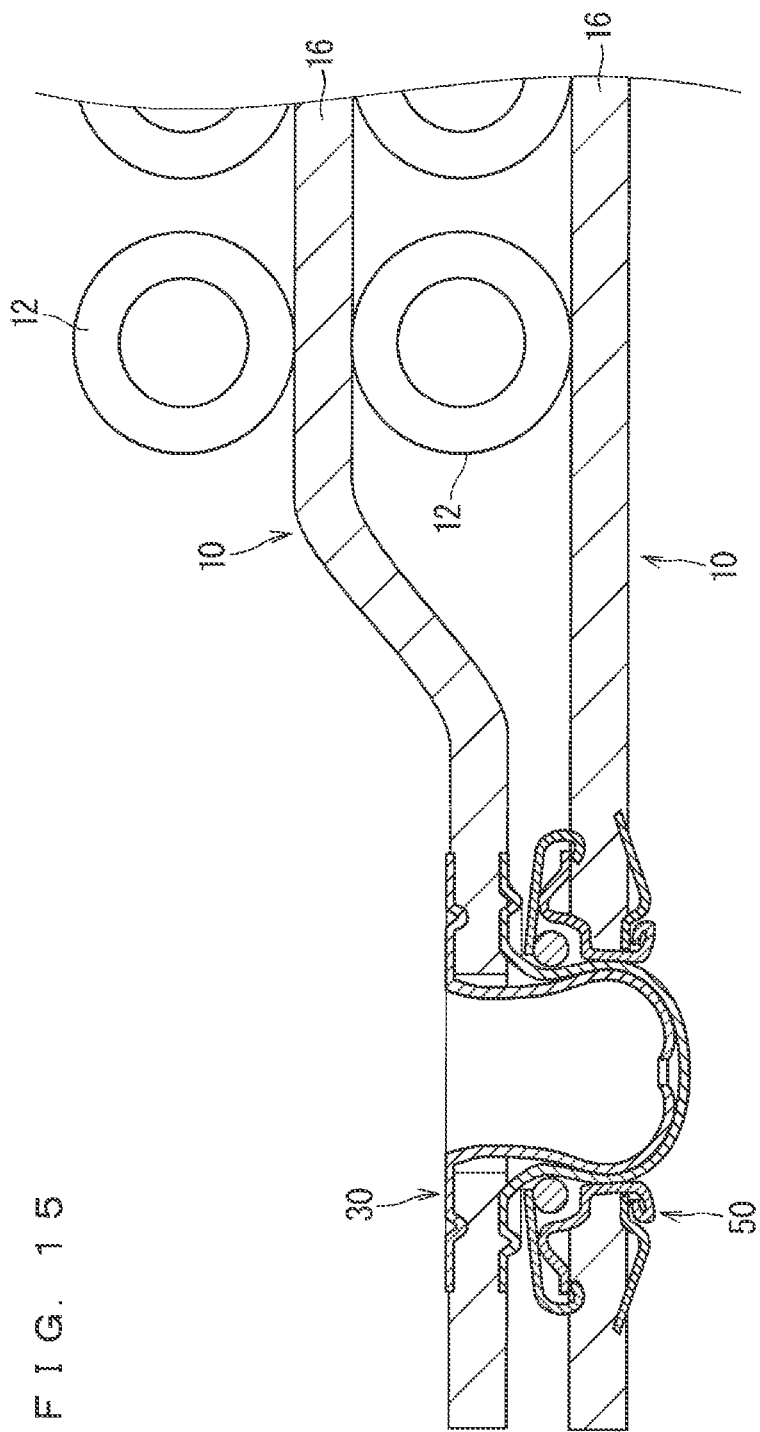
FIG. 15 A cross-sectional view illustrating a modification example of the attaching target member.
Figure 16:
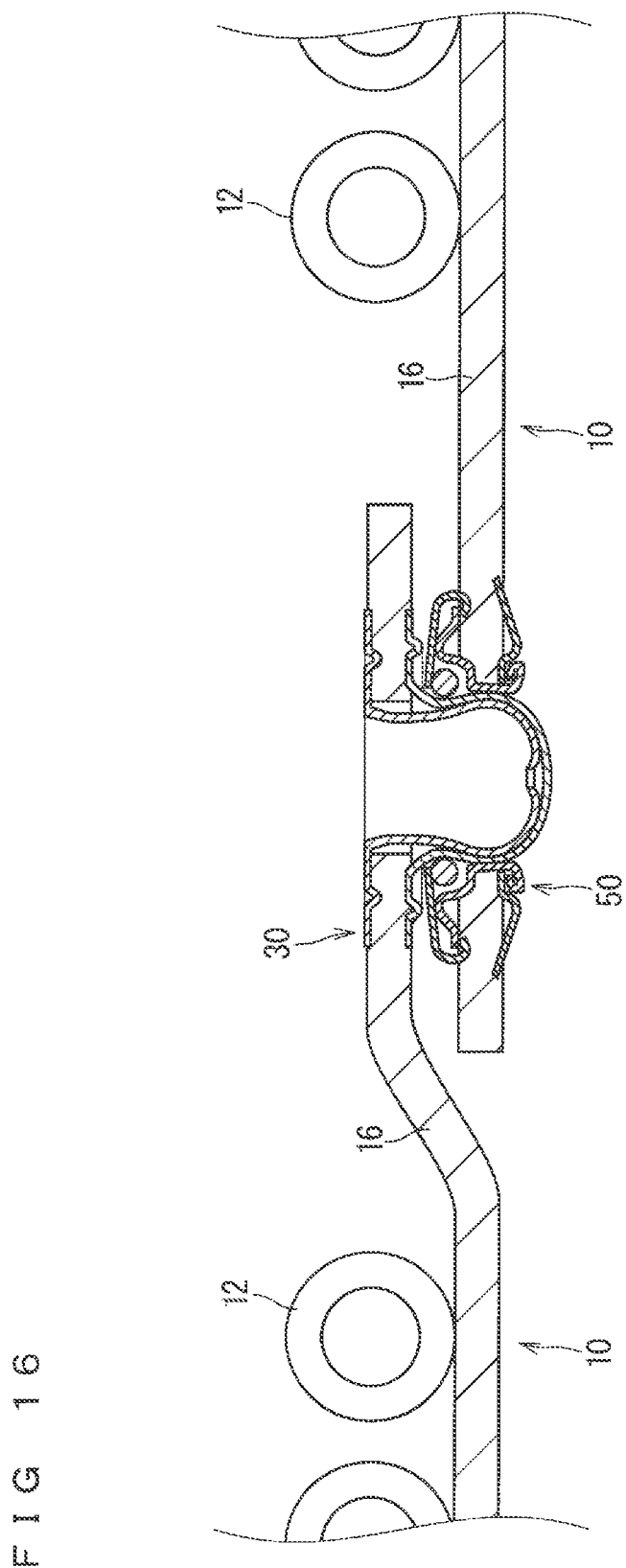
FIG. 16 A cross-sectional view illustrating a modification example of the attaching target member.
Figure 17:
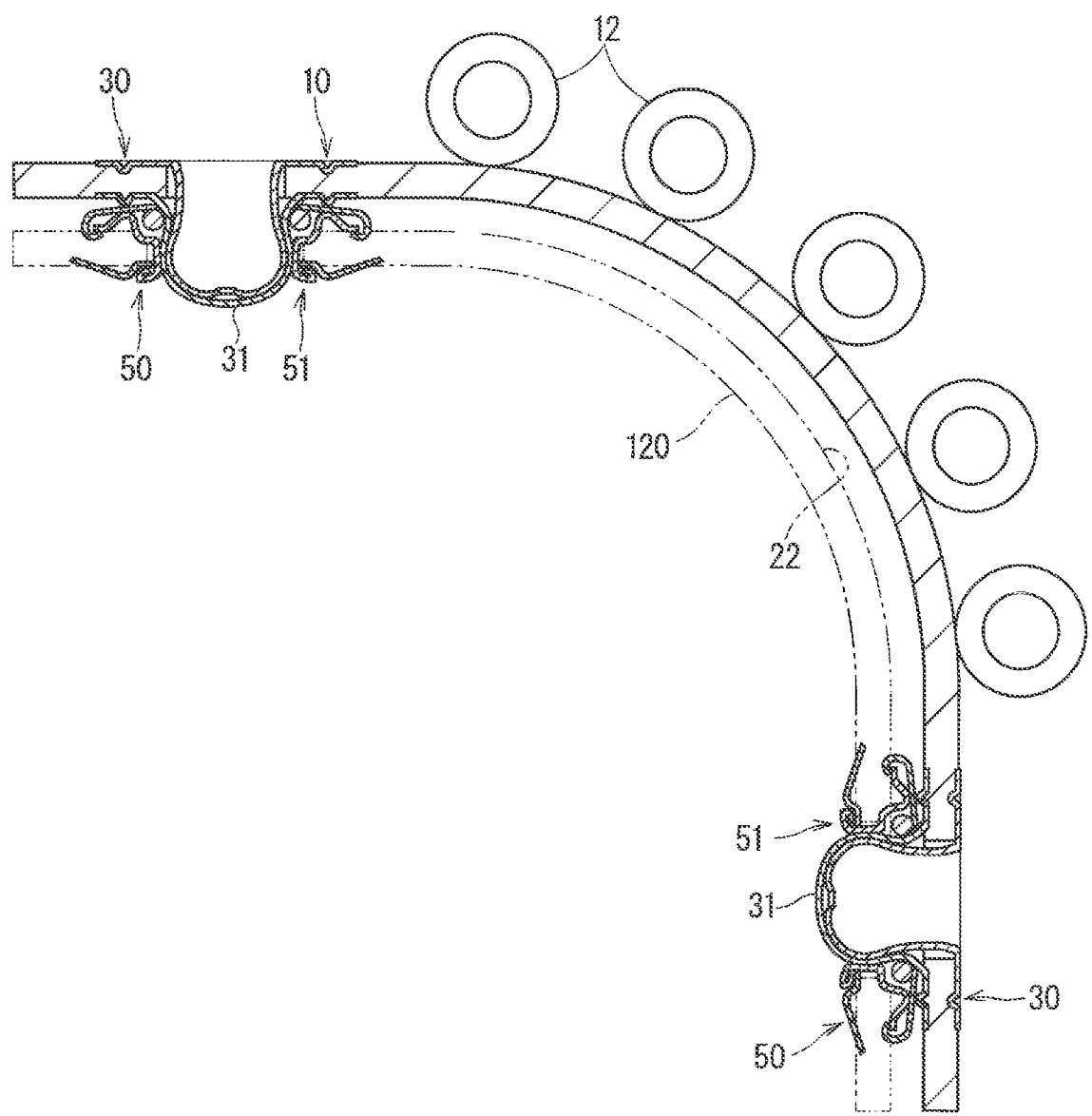
FIG. 17 A cross-sectional view illustrating a modification example of the attaching target member.

FIG. 15 to FIG. 17 are cross-sectional views each illustrating a modification example of the attaching target member 20.

In the above description, the attaching target member 20 is the vehicle body, however, this configuration is not necessary. For example, there may be a case where the attaching target member 20 is the other wiring member 10 as illustrated in FIG. 15 and FIG. 16. In this case, one of the two wiring members 10 can be considered the other attaching target member.

In the examples illustrated in FIG. 15 and FIG. 16, the two flat wiring members are attached to each other by the male snap fastener 30 and the female snap fastener 50. At this time, in the example illustrated in FIG. 15, the two flat electrical wires 10 are stacked on each other. In the example illustrated in FIG. 16, the two flat electrical wires are connected to extend to a lateral side. In the example illustrated in FIG. 15 and FIG. 16, the two flat wiring members 10 are attached so that the wire-like transmission members 12 thereof are parallel to each other, however, this configuration is not necessary. The two flat wiring members 10 may be attached so that the wire-like transmission members 12 thereof intersect with each other.

In the above description, when the attaching target member 20 is the vehicle body, the flat wiring member 10 is attached to follow a planar surface part of the vehicle body, however, this configuration is not necessary. For example, as illustrated in FIG. 17, the flat wiring member 10 may be attached to follow a curved surface of the vehicle body.

More specifically, an attaching target member 120 is a vehicle body 120 having a curved surface 22. An intermediate part of the flat wiring member 10 along a width direction is curved and disposed along the curved surface 22 of the vehicle body 120. Both end portions of the flat wiring member 10 along the width direction is attached to the vehicle body 120 by the convex-shaped part 31 and the concave-shaped part 51. According to the present embodiment, the flat wiring member 10 can be curved and disposed along the curved surface 22 of the vehicle body 120.

FIG. 18 is a cross-sectional view illustrating a modification example of a snap fastener.

In the above description, the two members are attached using the convex-shaped part and the concave-shaped part, however, this configuration is not necessary. As illustrated in FIG. 18, three or more members may be attached using the convex-shaped part and the concave-shaped part.

At this time, FIG. 18 illustrates an example that two wiring members 10 stacked on each other are attached to the vehicle body 20. In the example illustrated in FIG. 18, a snap fastener 270 provided in a member intermediately located includes both the convex-shaped part 231 and the concave-shaped part 251. That is to say, the snap fastener 270 is the male-female snap fastener 270. For example, the male-female snap fastener 270 is considered to be formed by snapping the male body part 232 and the female body part 252 mutually located in opposite directions with the sheet member 16 therebetween by a rivet R, for example.

The female snap fastener 250 is attached to the convex-shaped part 231 of the male-female snap fastener 270, and the male snap fastener 230 is attached to the concave-shaped part 251 of the male-female snap fastener 270. As described above, the other wiring member 10 and the vehicle body 20 are attached as the first and second attaching target members to one wiring member 10 by the male-female snap fastener 270. It is obvious that three or more wiring members 10 stacked by the male-female snap fastener 270 may be attached. According to the present embodiment, the three or more members can be attached. It goes without saying that the male-female snap fastener 270 may be provided in place of the male snap fastener 230 and the female snap fastener 250. The male-female snap fastener 270 can also be considered one modification example of the male snap fastener 230 and one modification example of the female snap fastener 250.

Other Modification Example

In addition, in the above description, the wiring body 10 is the flat wiring body 10, however, this configuration is not necessary. The wiring body 10 may be a wire bundle made up of the plurality of electrical wires 12 bundled to have a round shape in cross section, for example.

Each configuration described in the embodiment and each modification example can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 1 attachment structure of wiring member
10 wiring member
12 wire-like transmission member (electrical wire)
16 base member (sheet member)
20 attaching target member (vehicle body)
20h attaching hole
30 male snap fastener
31 convex-shaped part
32 male body part
36 receiving part
50 female snap fastener
51 concave-shaped part
52 female body part
55 ring spring (elastic deformation part)
56 receiving part
70 male-female snap fastener

The invention claimed is:

1. A wiring member, comprising:
a base member;
a wire-like transmission member fixed to the base member; and
a plurality of attaching members, including first and second attaching members, provided to the base member to be attached to an attaching target member, wherein
the first attaching member is provided to only one lateral side of the wire-like transmission member in a first position along an extension direction of the wire-like transmission member in the base member, and the second attaching member is provided to only another lateral side of the wire-like transmission member in a second position along the extension direction of the wire-like transmission member.

2. The wiring member according to claim 1, wherein
the base member includes a band-like part along a route of the wire-like transmission member and extension parts, each extending to a lateral side of the band-like part,
the wire-like transmission member is fixed to the band-like part,
the attaching members are provided to the extension parts, and
one extension part is provided to only the one lateral side of the wire-like transmission member in the first position, and another extension part is provided to only the other lateral side of the wire-like transmission member in the second position.

3. The wiring member according to claim 1, wherein
the base member includes a band-like part along a route of the wire-like transmission member and extension parts, each extending to a lateral side of the band-like part,
the wire-like transmission member is fixed to the band-like part,
the attaching members are provided to the extension parts, and
the extension parts are provided to the one lateral side and the other lateral side of the wire-like transmission member in the first position, the second position, and a position between the first position and the second position.

4. The wiring member according to claim 1, wherein
a third attaching member, of the plurality of attaching members, is provided to only the one lateral side of the wire-like transmission member in a third position on a side opposite to the first position in relation to the second position along the extension direction of the wire-like transmission member in the base member.

5. An attachment structure of a wiring member, comprising:
the wiring member according to claim 1; and
an attaching target member to which the wiring member is attached via the attaching members.

6. The attachment structure of the wiring member according to claim 5, wherein
the attaching members are configured to be detachable from the attaching target member.

* * * * *